(12) United States Patent
Oh

(10) Patent No.: US 7,142,439 B2
(45) Date of Patent: Nov. 28, 2006

(54) ZERO-VOLTAGE-SWITCHING SINGLE-SWITCHED RESONANT DC LINK WITH MINIMIZED CONDUCTION LOSS

(75) Inventor: In-Hwan Oh, Cupertino, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 0 days.

(21) Appl. No.: 10/691,734

(22) Filed: Oct. 22, 2003

(65) Prior Publication Data

US 2004/0136210 A1    Jul. 15, 2004

Related U.S. Application Data

(60) Provisional application No. 60/420,839, filed on Oct. 23, 2002.

(51) Int. Cl.
*H02M 5/458* (2006.01)
(52) U.S. Cl. ........................................................ 363/37
(58) Field of Classification Search ................. 363/34, 363/35, 37
See application file for complete search history.

(56) References Cited

U.S. PATENT DOCUMENTS

| | | | |
|---|---|---|---|
| 4,489,373 A | 12/1984 | du Parc | |
| 4,561,046 A | 12/1985 | Kuster | |
| 4,730,242 A * | 3/1988 | Divan | 363/37 |
| 4,785,387 A | 11/1988 | Lee et al. | |
| 4,864,483 A * | 9/1989 | Divan | 363/37 |
| 5,055,991 A | 10/1991 | Carroll et al. | |
| 5,260,607 A | 11/1993 | Kinbara | |
| 5,351,179 A | 9/1994 | Tsai et al. | |
| 5,379,206 A | 1/1995 | Davidson | |
| 5,396,410 A | 3/1995 | Okochi et al. | |
| 5,559,685 A * | 9/1996 | Lauw et al. | 363/37 |
| 5,617,308 A * | 4/1997 | Weise et al. | 363/98 |
| 5,621,623 A | 4/1997 | Kuriyama et al. | |
| 5,633,579 A | 5/1997 | Kim | |
| 5,633,793 A * | 5/1997 | Lee et al. | 363/127 |
| 5,636,114 A | 6/1997 | Bhagwat et al. | |
| 5,694,302 A | 12/1997 | Faulk | |
| 5,703,763 A | 12/1997 | Smeets | |
| 5,841,644 A * | 11/1998 | Lipo et al. | 363/37 |
| 6,069,803 A | 5/2000 | Cross | |

(Continued)

OTHER PUBLICATIONS

Chuanwen Ji et al., "Cross Regulation in Flyback Converters: Solutions," Dept. of Electrical & Computer Engineering University of California, Irvine, 7 pages, no date.

(Continued)

*Primary Examiner*—Gary L Laxton
(74) *Attorney, Agent, or Firm*—Sidley Austin LLP

(57) ABSTRACT

A Single-switched Resonant DC Link (SRDCL) converter is presented for a parallel resonant network with a single auxiliary power device for low conduction loss in single or poly-phase inverter and converter applications. The resonant network with an auxiliary power device is activated when the status of power devices coupled to the DC link changes. The resonant network forces the DC link voltage to drop to zero before any of the power devices coupled to the DC link are turned on. The auxiliary switch is also turned on with a Zero-Voltage Switching condition. Therefore, the switching losses caused in all power devices can be effectively eliminated. There is no severe conduction loss in the auxiliary power device because the resonant circuit is not activated if there is no change of status in the power devices coupled to the DC link.

2 Claims, 6 Drawing Sheets

U.S. PATENT DOCUMENTS

| | | | |
|---|---|---|---|
| 6,091,615 A * | 7/2000 | Inoshita et al. | 363/98 |
| 6,111,770 A * | 8/2000 | Peng | 363/131 |
| 6,115,271 A | 9/2000 | Mo | |
| 6,130,826 A | 10/2000 | Matsumoto | |
| 6,233,165 B1 | 5/2001 | Irissou et al. | |
| 6,314,002 B1 | 11/2001 | Qian et al. | |
| 6,330,170 B1 * | 12/2001 | Wang et al. | 363/37 |

OTHER PUBLICATIONS

G. Spiazzi et al., "A Low-Loss High-Power-Factor Flyback Rectifier Suitable for Smart Power Integration," *2000 IEEE*, 6 pages, no month.

Nigel Machin et al., "New Lossless Clamp for Single Ended Converters," Rectifier Technologies Pacific, 5 pages, no date.

\* cited by examiner

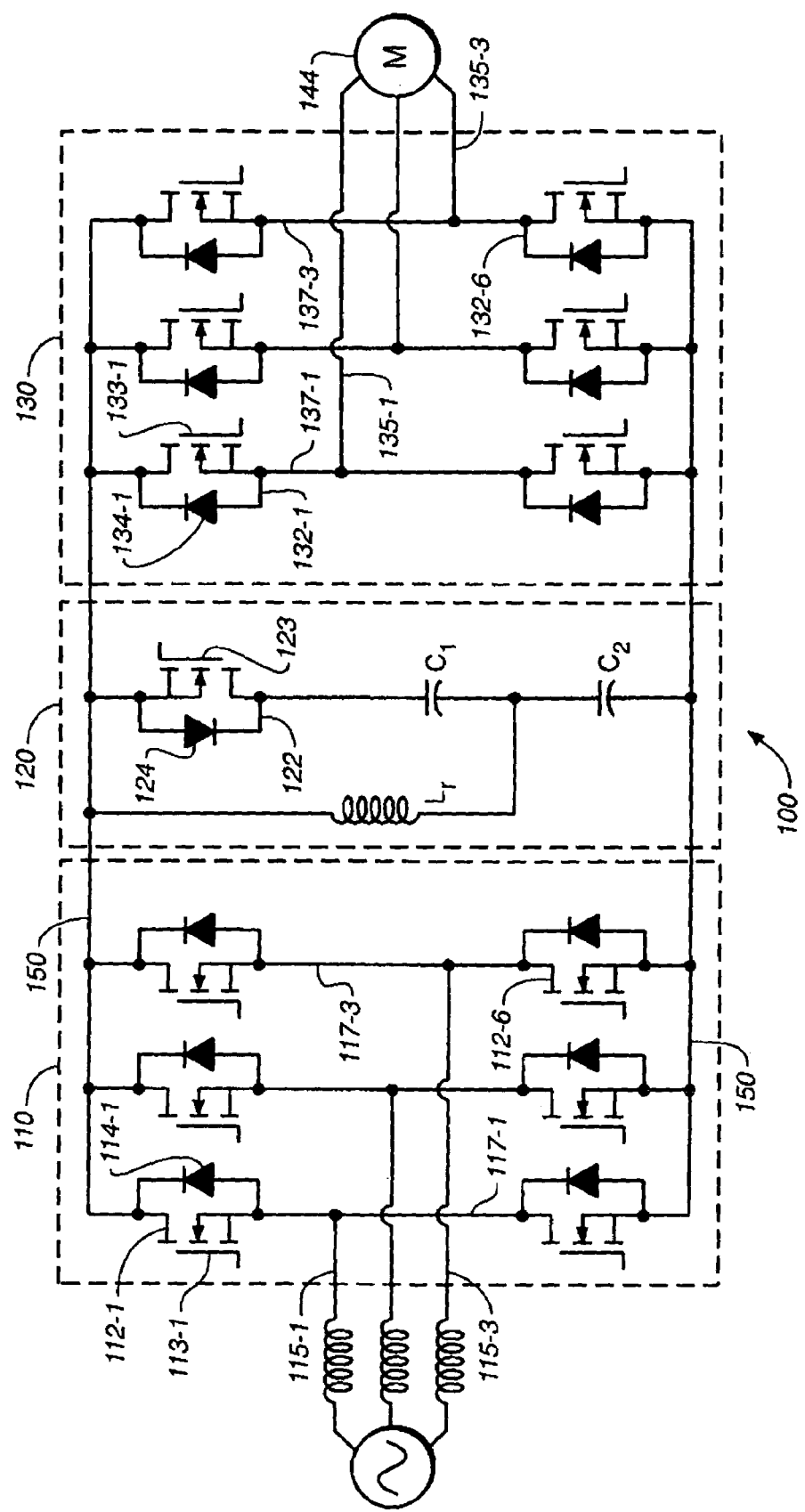
FIG._1

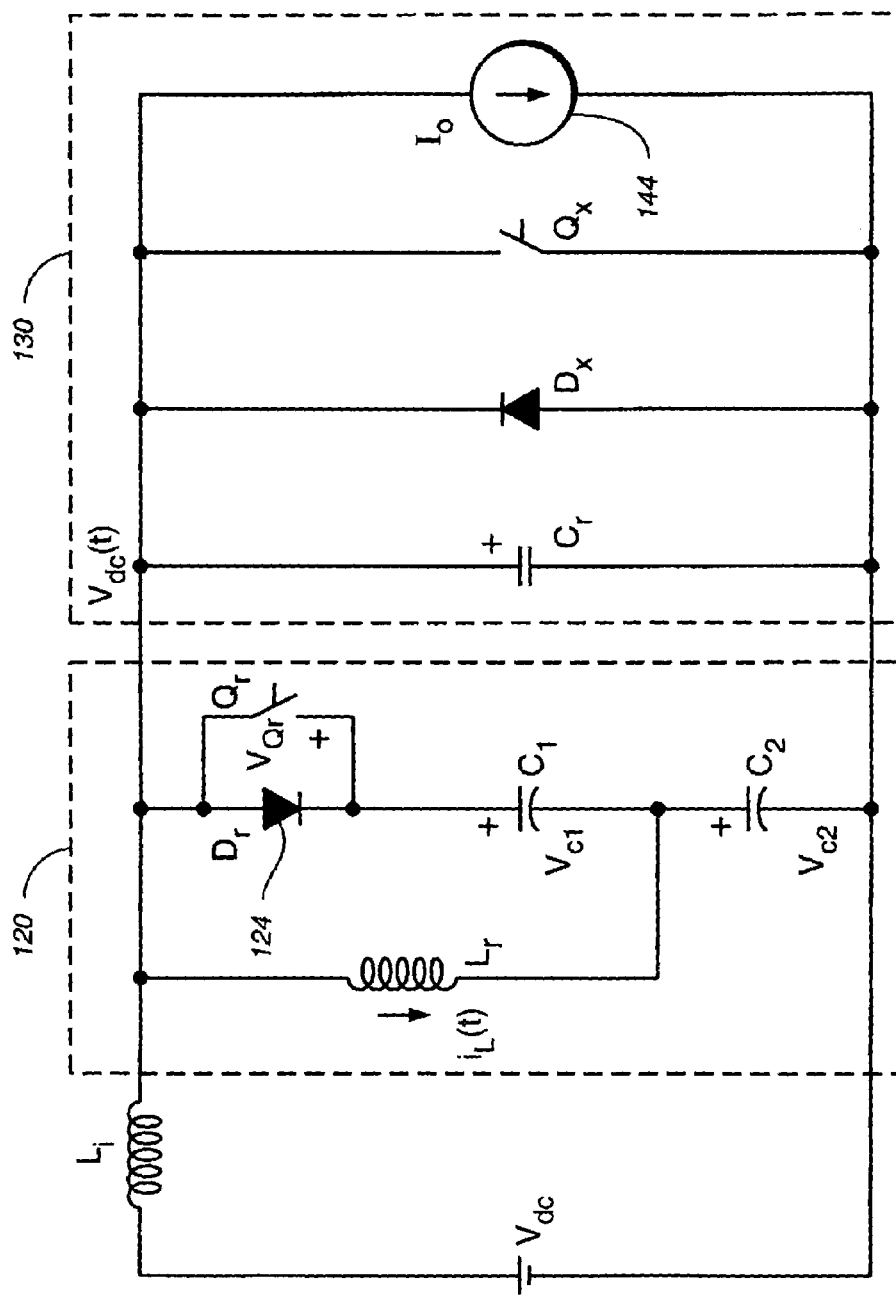
FIG._2

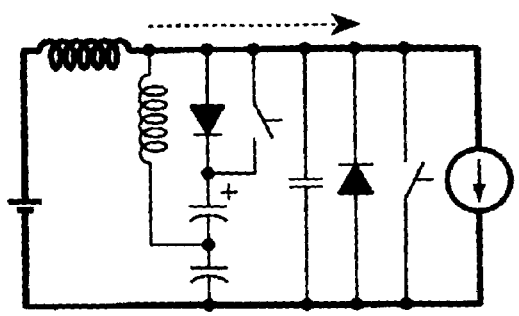
*FIG._3A*
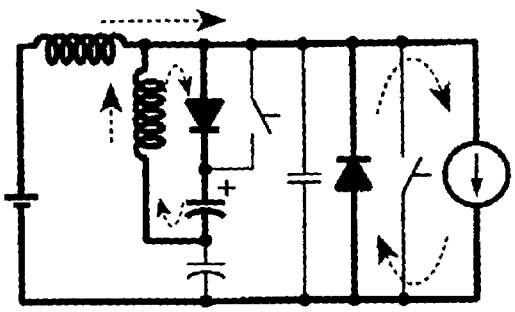
*FIG._3B*
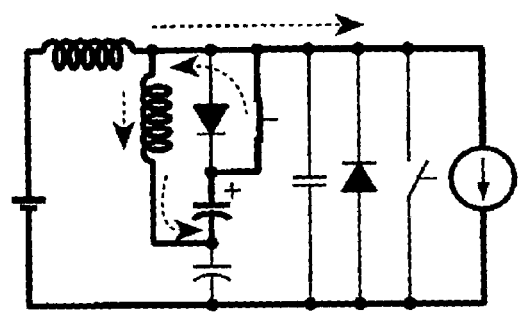
*FIG._3C*
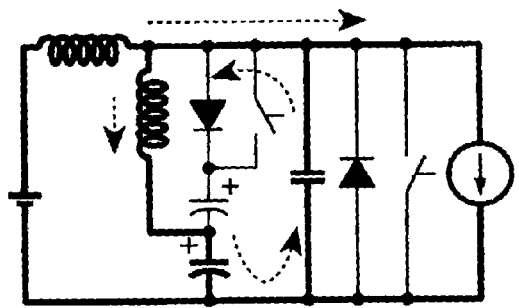
*FIG._3D*
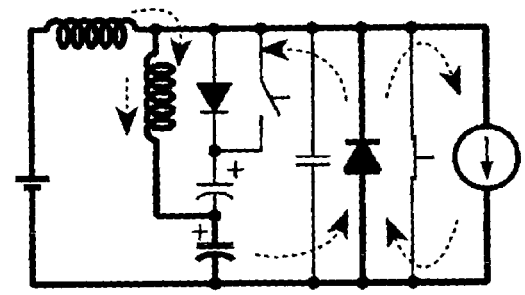
*FIG._3E*
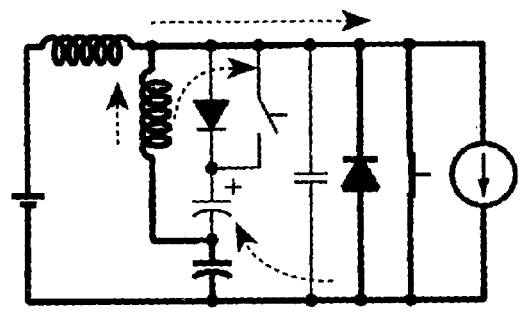
*FIG._3F*
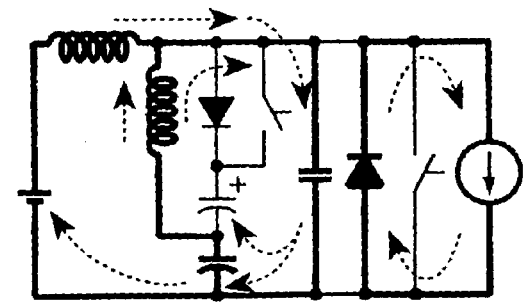
*FIG._3G*
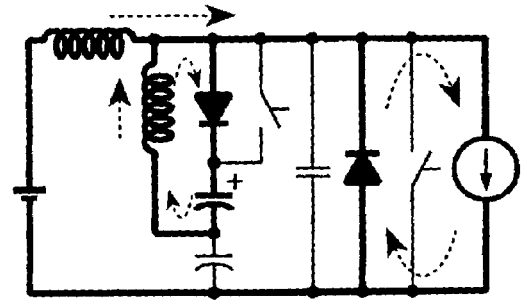
*FIG._3H*

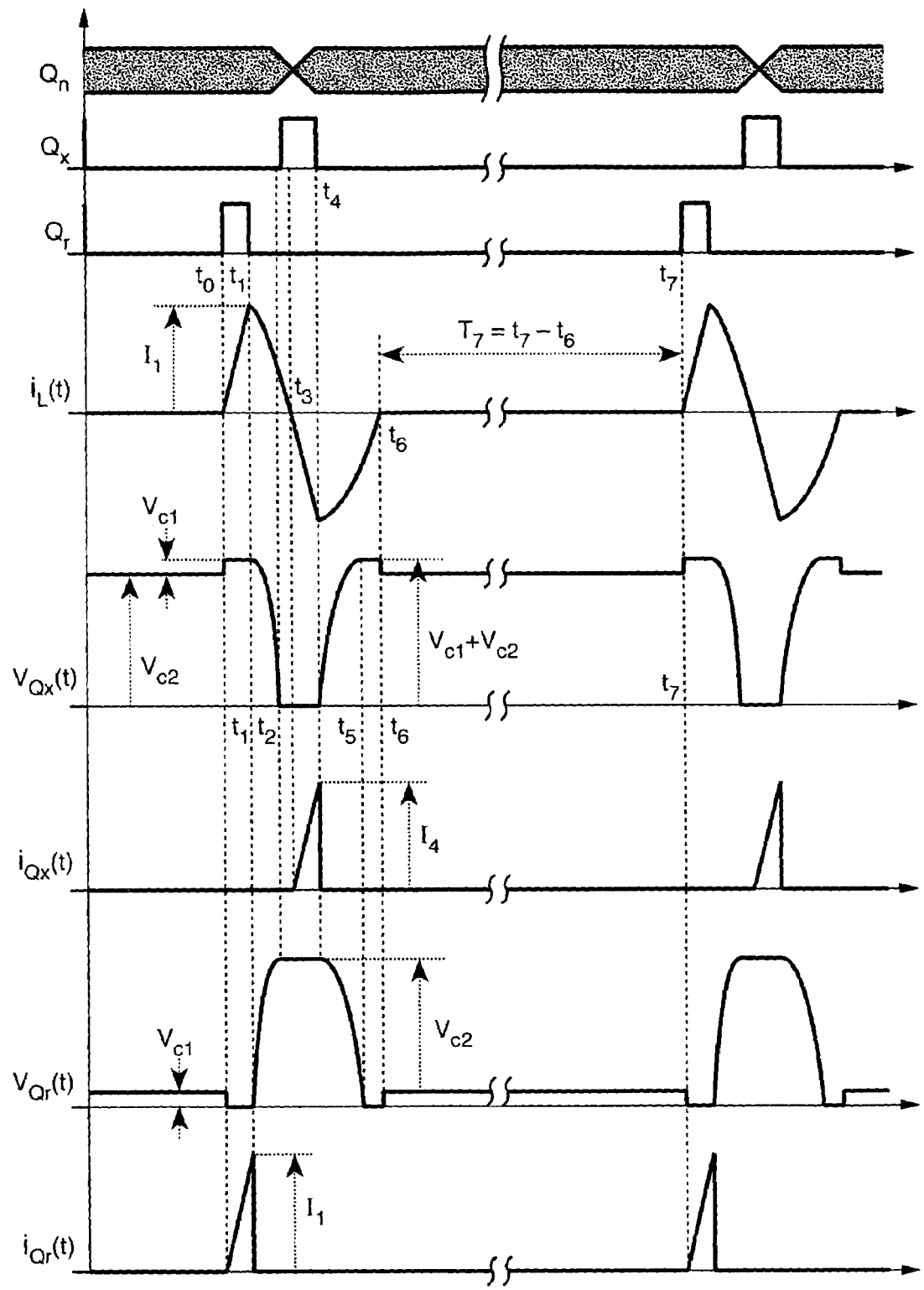
FIG._4

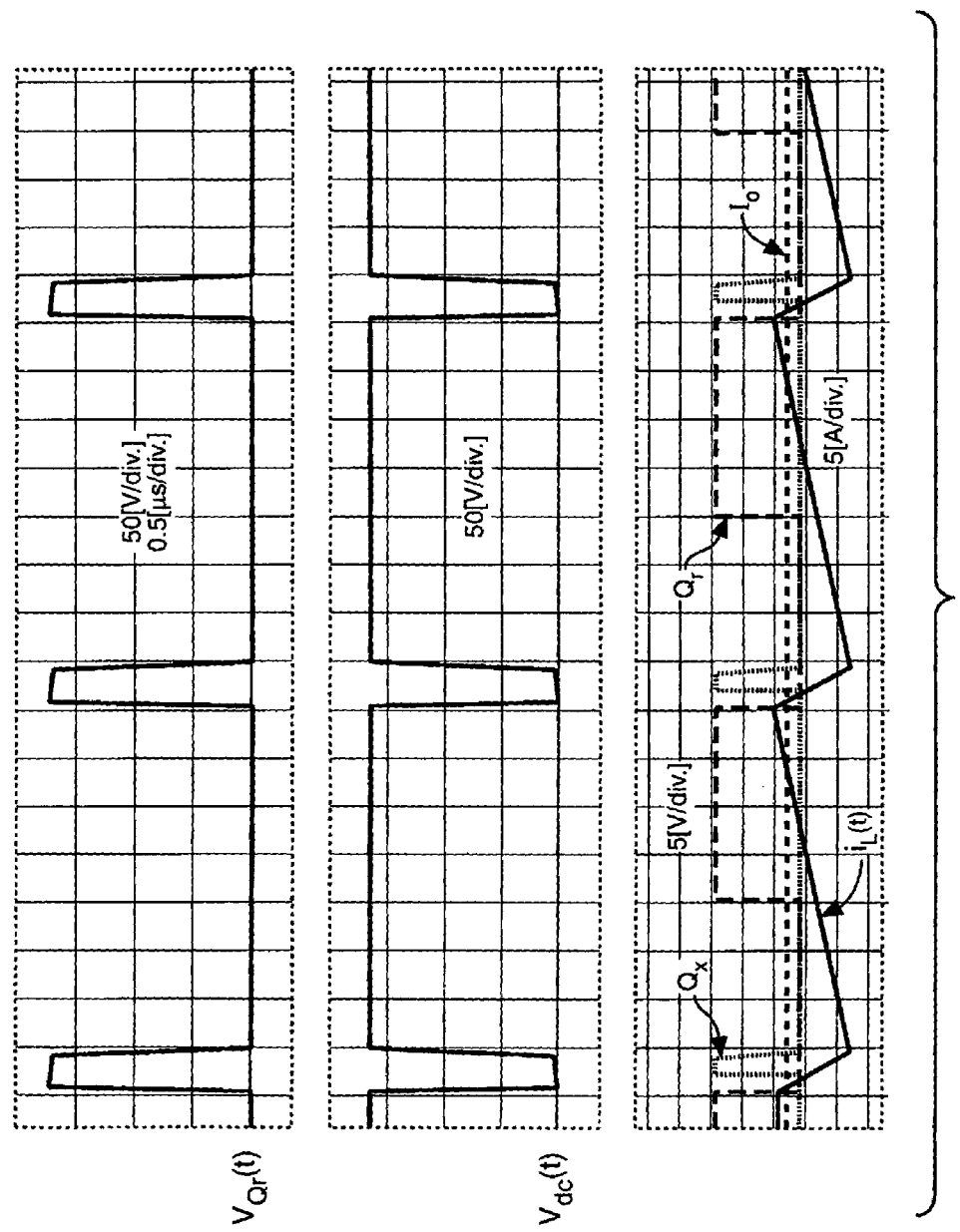
FIG._5A

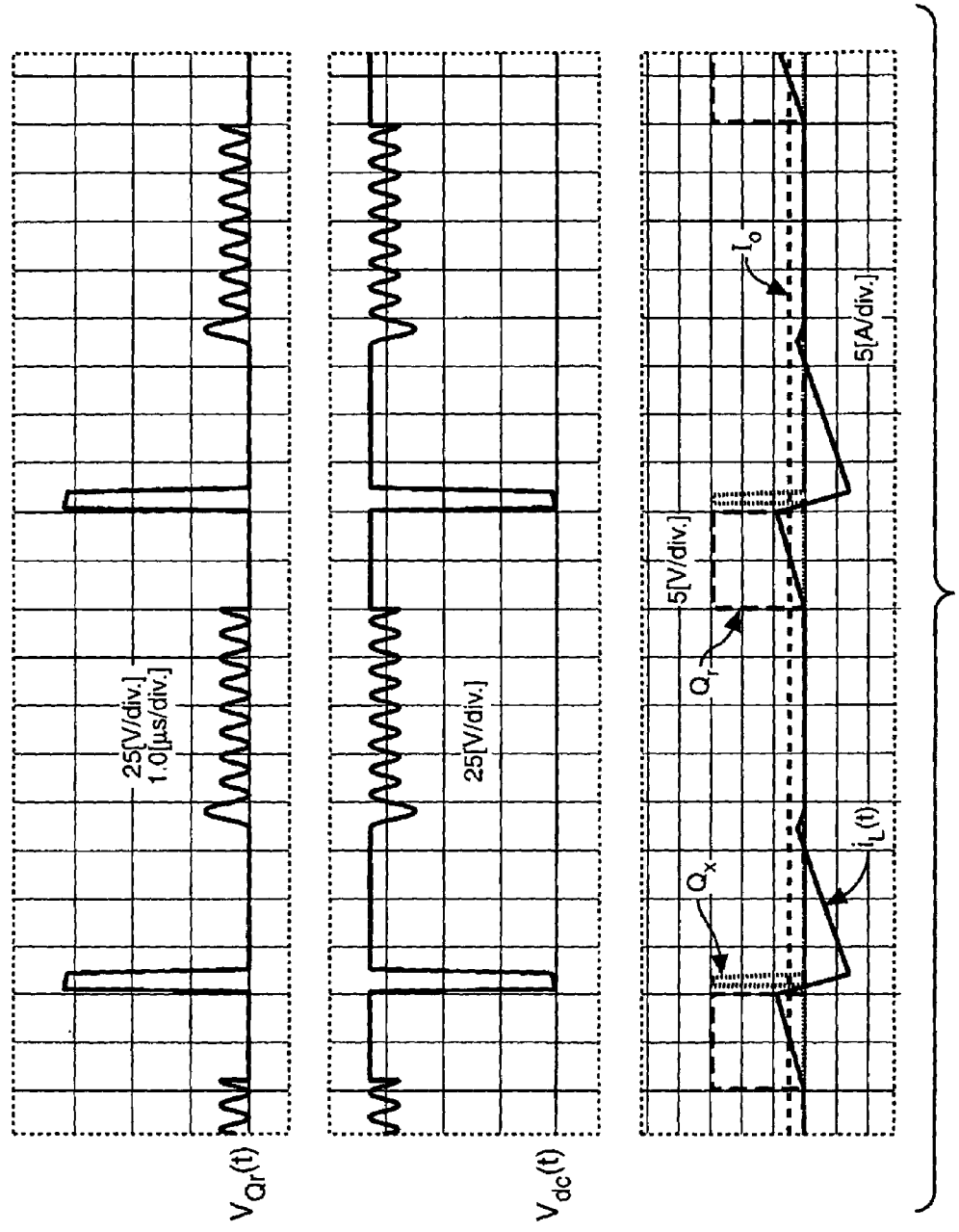
FIG._5B

ZERO-VOLTAGE-SWITCHING SINGLE-SWITCHED RESONANT DC LINK WITH MINIMIZED CONDUCTION LOSS

CROSS REFERENCE TO RELATED APPLICATIONS

This application claims priority from provisional U.S. application 60/420,839: "Zero-voltage-switching SRDCL (single-switched resonant DC link) inverter with minimized conduction loss" by In-Hwan Oh, filed Oct. $23^{rd}$, 2002.

BACKGROUND OF INVENTION

1. Field of Invention

The present invention relates to DC-to-DC or DC-to-AC poly-phase converters, and more particularly to Single-switched Resonant DC Link (SRDCL) converters, employing power devices, which switch with zero voltage switching condition.

2. Description of Prior Art

Power devices can experience considerable loss during switching losses. A cause of this loss is that during the switching process the current and the voltage of the device can be simultaneously non-zero. This problem was addressed in U.S. Pat. No. 4,730,242 issued on May 8, 1988, describing a Resonant DC Link (RDCL) converter. A related actively clamped RDCL converter is shown in U.S. Pat. Nos. 4,864,483 and 5,038,267. A corresponding method for detecting zero voltage conditions is described in U.S. Pat. No. 5,166,549 issued on Nov. 24, 1992.

However, an aspect of the actively clamped RDCL converters is the high voltage stress on the main converter switches, because the voltage stress by the natural resonance can be 2–3 times higher than the input DC source voltage, as described by In-Hwan, et al. in "Simple Soft-Switched PWM Inverter Using Source Voltage Clamped Resonant Circuit," IEEE Tran. on Industrial Electronics Vol. 46, pp. 468–471, April 1999]. To relieve this high voltage stress problem, alternative parallel resonant circuits and DC rail soft-switched resonant circuits are described in U.S. Pat. No. 5,111,374 issued on May 5, 1992; U.S. Pat. No. 5,172,309 issued on Dec. 15, 1992; U.S. Pat. No. 5,412,557, issued on May 2, 1995, and U.S. Pat. No. 5,559,685 issued on Sep. 24, 1996. However, these schemes require two or three more switches and hence are still quite expensive and complex approaches. The clamped RDCL converter disclosed in U.S. Pat. No. 5,617,308 uses only one switch to achieve the soft switching. But the resonant link voltage in this patent may be significantly increased because the clamping capacitor is charged by a reactive energy of the inductive load.

The link voltage can be clamped by a synchronized resonant DC link converter for the soft-switched PWM using a simple implementation and easy control, as described by D. M. Divan, et al. in: "Design Methodologies for Soft Switched Inverters," IEEE Trans. on Ind. Appl., Vol. 29, No. 1, pp. 126–135, January/February, 1993]. This SRDCL scheme can clamp the peak voltage stress, but the peak voltage of the SRDCL converter is still higher than Vdc. In addition, the DC link voltage may be greatly increased, when the load current changes because the load current charges the clamping capacitor. Moreover, the current stress on the resonant switch may be large, since the load current overlaps with the resonant current, as can be seen from the experimental results shown in FIGS. 6A and 6B, as discussed by In-Hwan Oh et al in, "A Source Voltage Clamped Resonant Link Inverter for a PMSM using a Predictive Current Control Technique", IEEE Transactions on Power Electronics, Vol. 14, No. 6, pp. 1122–1132, November 1999].

A particular feature of the above-described converters is that the auxiliary power device of the resonance of DC link is placed into the power line. Such topologies cause a power loss by the load current, while the DC link voltage is at a nominal voltage level.

SUMMARY

Briefly and generally, embodiments of the invention include a converter circuit, which includes an AC-to-DC converter, which can be a simple bridge rectifier or contains a group of first power devices, a resonant DC link, including an auxiliary power device, a DC-to-AC converter, which includes a group of second power devices, and DC link lines, coupling the AC-to-DC converter, the resonant DC link, and the DC-to-AC converter, wherein the auxiliary power device is coupled between the DC link lines.

Additional embodiments include a converter, which includes an AC-to-DC converter, a resonant DC link, a DC-to-AC converter, and DC link lines. The DC-to-AC converter includes a resonant capacitor, an equivalent power diode, and an equivalent switch, wherein the resonant capacitor, the equivalent power diode, and the equivalent switch are coupled between the DC link lines and parallel with each other. The resonant DC link includes an auxiliary power device. The DC link lines couple the AC-to-DC converter, the resonant DC link, and the DC-to-AC converter. The auxiliary power device is coupled between the DC link lines.

Embodiments of the invention can be operated with a zero voltage switching condition.

BRIEF DESCRIPTION OF DRAWINGS

For a more complete understanding of the present invention and for further features and advantages, reference is now made to the following description taken in conjunction with the accompanying drawings.

FIG. 1 illustrates a converter topology, according to an embodiment of the invention.

FIG. 2 is an equivalent circuit of the converter topology, according to an embodiment of the invention.

FIGS. 3A–H illustrate steps of a method of operating the converter circuit, according to an embodiment of the invention.

FIG. 4 illustrates various currents and voltages during the different steps of the method of FIGS. 3A–H, according to an embodiment of the invention.

FIG. 5 illustrates various currents and voltages during the different steps of the method of FIGS. 3A–H, according to an embodiment of the invention.

DETAILED DESCRIPTION

Embodiments of the present invention and their advantages are best understood by referring to FIGS. 1–5 of the drawings. Like numerals are used for like and corresponding parts of the various drawings.

FIG. 1 illustrates an embodiment of the invention. A converter circuit 100 includes an AC-to-DC converter 110. AC-to-DC converter 110 includes a group of power devices 112-1 . . . 112-n. Converter 100 also includes a resonant DC link 120, which includes at least one auxiliary power device 122. Converter 100 further includes a DC-to-AC converter 130, which includes a group of second power devices 132-1 ... 132-n', and DC link lines 150. DC link lines 150 couple AC-to-DC converter 110, resonant DC link 120, and DC-to-AC converter 130. Auxiliary power device 122 is coupled between DC link lines 150.

In AC-to-DC converter 110 the number of power devices 112, n, can be between two or more depending on output phases. For example, n can be six in embodiments, which receive a three-phase AC power. Power devices 112 can contain power transistors 113-1 ... 113-n, of the MOS-FET type or NPN bipolar transistors. In some embodiments power diodes 114-1 ... 114-n are coupled across power transistors 112. In some embodiments, power diodes 114 are not formed explicitly, they are parasitic diodes, formed as a byproduct of forming power transistors 113. In embodiments, where power devices 112 are MOS-FETs, power diodes 114 are coupled between the source and the drain of the corresponding power MOS-FET.

In AC-to-DC converter 110 power devices 112 are coupled pair wise in series, 112-1 and 112-2 forming a first arm 117-1, 112-3 and 112-4 forming a second arm 117-2, and 112-5 and 112-6 forming a third arm 117-3. In other embodiments the number of arms can be between about 1 and about 6.

In some embodiments terminals 115-1 ... 115-3 are coupled to arms 117-1 ... 117-3 between the power transistors of the corresponding arm. Terminals 115 can be coupled to an external AC power source to receive an AC current.

In DC-to-AC converter 130 the number of power devices 132, n', can be two or more depending on the AC output phase, for example, six for three-phase systems. Power devices 132 can include power transistors 133-1 ... 133-n'. Power transistors 133 can be, for example, MOS-FET devices. In some embodiments power diodes 134-1 ... 134-n' are coupled across power transistors 133-1 ... 133-n'. In other embodiments, power diodes 134 can be formed as a byproduct of forming power transistors 133. In embodiments, where power devices 132 are MOS-FETs, power diodes 134 are coupled between the source and the drain of the corresponding power MOS-FETs.

In AC-to-DC converter 130 power devices 132 are coupled pair wise in series, 132-1 and 132-2 forming a first arm 137-1, 132-3 and 132-4 forming a second arm 137-2, and 132-5 and 132-6 forming a third arm 137-3. In other embodiments the number of arms can be between 1 and 6.

In some embodiments terminals 135-1 ... 135-3 are coupled to arms 137-1 ... 137-3 between the power transistors of the corresponding arm. Terminals 135 can be coupled to an external load 144 to deliver an AC current. External load 144 can be, for example, a motor, denoted by M.

Auxiliary power device 122 of resonant DC link 120 includes an auxiliary power transistor 123, which can be of the MOS-FET or npn bipolar power transistor type. An auxiliary power diode 124 is coupled across auxiliary power transistor 123. In embodiments, where auxiliary power transistor 123 is a MOS-FET, auxiliary power diode 124 can be coupled between the drain and the source of the MOS-FET. In other embodiments, auxiliary power diode 124 can be formed as a byproduct of forming auxiliary power transistor 123.

Further elements of resonant DC-link include a first capacitor $C_1$, coupled in series with auxiliary power device 122, an inductance $L_r$, coupled in parallel with auxiliary power device 122 and first capacitor $C_1$. In some embodiments capacitors $C_1$ and $C_2$ have large capacitances, for example, in comparison to the parasitic capacitances of the rest of converter 100. In these embodiments the characteristic time associated with capacitors $C_1$ and $C_2$ is much longer than other characteristic times of converter 100. Therefore, capacitors $C_1$ and $C_2$ can be considered as voltage sources since the voltages of capacitors $C_1$ and $C_2$ change much slower than the voltages in the rest of the circuit.

FIG. 2 illustrates another embodiment of the invention. This embodiment is essentially equivalent to the converter of FIG. 1. The functions of AC-to-DC converter 110 can be performed by a simplified input circuit, which includes a voltage source $V_{dc}$ coupled in series with an inductor $L_i$.

In DC-to-AC converter 130 an equivalent switch $Q_x$ can replace power devices 132. Anti-parallel diode $D_x$ represents all power diodes 114 and 134. The current, drawn by load 144 can be considered as a current source $I_o$ for the rest of the circuit, because in some embodiments the load inductance can be up to 10 times or more bigger than the resonant inductance $L_r$. Capacitor Cr in DC-to-AC converter 130 represents all parasite capacitors between resonant DC link 120 and all parallel- and series-connected output capacitors of power devices 112 and 132. The closed/conducting/turned on state of equivalent switch $Q_x$ corresponds to a situation when both power transistors of a given arm are in a closed/conducting/turned on state.

During the operation of converter 100 inductor $L_r$ and capacitor $C_r$ form a resonant circuit with the fastest characteristic time of the circuit: $T_2 = 2\pi\sqrt{L_r C_r}$. $T_2$ will be also referred to as the resonant cycle or resonant time.

In resonant DC link 120 resonant switch Qr and power diode $D_r$ represent auxiliary power device 122. The $V_{c1}$ and $V_{c2}$ voltages represent the essentially constant voltages of capacitors $C_1$ and $C_2$.

Straightforward circuit analysis shows that the embodiment of FIG. 2 performs essentially analogously to the converter 100 of FIG. 1. Next, the operation of converter 100 will be described.

In some embodiments the operation can be divided into five steps or phases based on the switching time of the power devices and the resonant cycle. The number of steps or phases depends on the various characteristic time constants of the circuit. These time constants include the switching times of the power devices and the period of the resonant cycle of $L_r$ and $C_r$. The analysis will disregard the non-ideal aspects of switches $Q_x$ and $Q_r$ and the core saturation of inductance $L_r$.

FIGS. 3A–H illustrate the steps of the operation of the converters 100 of FIGS. 1 and 2. In these drawings thick lines indicate electrical couplings, where a major portion of the current is flowing.

Converter 100 can have at least two initial states for $t < t_0$: State 0 and State 1, as shown in FIGS. 3A and B.

FIG. 3A illustrates that in State 0 switches $Q_x$ and $Q_r$ are open and a major portion of the current is flowing in DC link lines 150 and load 144.

FIG. 3B illustrates that in State 1 switches $Q_x$ and $Q_r$ are also open. A major portion of the current is flowing through DC link lines 150 and load 144. In addition, current is flowing through $L_r$ and $C_r$ and power diode $D_x$.

We consider the steps of the method starting with State 0, in which equivalent switch $Q_x$ is open/turned off.

FIG. 3C illustrates Step 1. In Step 1 ($t_0 \leq t < t_1$) resonant switch $Q_r$ is turned on at $t = t_0$. The inductor current $i_L(t)$ flows through $C_1$, $Q_r$, and $L_r$. The current $i_L(t)$ flowing through inductor $L_r$ is given by:

$$i_{Lr}(t) = \frac{V_{c1}}{L_r} t \qquad (1)$$

The current $i_L(t)$ reaches a maximum value at time $t_1$:

$$I_1 \equiv i_{Lr}(t_1) = \frac{V_{c1}}{L_r}(t_1 - t_0) \qquad (2)$$

The voltage across equivalent switch $Q_x$ also will be referred to as the DC link voltage: $v_{Qx}(t) = v_{dc}(t)$. The value of the DC link voltage is given as:

$$v_{Qx}(t_0 \sim t_1) = V_{c1} + V_{c2} \qquad (3)$$

FIG. 3D illustrates Step 2. In Step 2 ($t_1 \leq t < t_2$) resonant switch $Q_r$ is turned off. At this time a major portion of the current flows through the circuit containing $L_r$ and $C_r$. The voltage across $C_2$ can be approximately considered as a voltage source $V_{c2}$ as described above. The voltage across equivalent switch $Q_x$ is given by:

$$v_{Qx}(t) = (V_{c1} + V_{c2})\cos \omega_r(t - t_1) \qquad (4)$$

The resonant time $T_2$ corresponding to the setting of Step 2 can be calculated as $$T_2 = 2\pi\sqrt{L_r C_r} \qquad (5)$$

The settings of Step 2 are maintained for a time period $t_2 - t_1$, whose length is chosen as $t_2 - t_1 = T_2$, so that at the end of Step 2 voltage $v_{dc}(t)$ drops to zero at $t = t_2$.

FIG. 3E illustrates the first period of Step 3. In the first period of Step 3 ($t_2 \leq t < t_3$), the anti-parallel diode, $D_x$, will be conducting/closed, because the inductor current $i_L(t)$ is positive (it flows towards capacitor $C_2$). $Q_x$ is turned on when $D_x$ is conducting and thus the voltage across $Q_x$ is zero. This feature of the present embodiment avoids power loss, a condition referred to as "Zero-Voltage-Switching" (ZVS) condition.

FIG. 3F illustrates the second period of Step 3. In the second period of Step 3 ($t_3 \leq t < t_4$) equivalent switch $Q_x$ is still turned on. However, the polarity of inductor current $i_L(t)$ changed to negative. In this period inductor current $i_L(t)$ decreases linearly with voltage $V_{c2}$ of second capacitor $C_2$. At the end of the second period of Step 3 at $t = t_4$ equivalent switch $Q_x$ is turned off. The current across equivalent switch $Q_x$ can be written as:

$$i_{Qx}(t) = \frac{V_{c2}}{L_r}(t - t_3) \qquad (6)$$

reaching the maximum value at $t_4$:

$$I_4 \equiv i_{Qx}(t_4) = \frac{V_{c2}}{L_r}(t_4 - t_3) \qquad (7)$$

FIG. 3G illustrates Step 4. In Step 4 ($t_4 \leq t < t_5$) the polarity of inductor current $i_L(t)$ is negative and $Q_x$ is turned off. Therefore, in Step 4 DC link voltage $v_{Qx}(t)$ increases due to the resonance between $L_r$ and $C_r$.

FIG. 3H illustrates Step 5. In Step 5 ($t_5 \leq t < t_6$), when DC link voltage $v_{Qx}(t)$ reaches a value ($V_{c1} + V_{c2}$) at $t = t_5$, the extra resonant inductor current can be directed through $L_r$, $D_r$, and $C_1$. The DC link voltage $v_{Qx}(t)$ can be written as:

$$v_{Qx}(t) = (V_{c1} + V_{c2})\sin \omega_r(t - t_4) \qquad (8)$$

FIGS. 4, 5A, and 5B illustrate the currents and voltages corresponding to the Steps of FIGS. 3A–H.

FIGS. 4, 5A, and 5B illustrate the zero voltage switching (ZVS) feature of converter 100. The turn-on signal of $Q_x$ is applied after the voltage $v_{Qx}(t) = v_{dc}(t)$ reaches zero. Further, the turn-on signal of resonant switch $Q_r$ can be applied between ($t_5 \leq t < t_6$), in which time period the voltage $v_{Qr}(t)$ is zero. Therefore, both switches $Q_x$ and $Q_r$ are turned on with zero-voltage switching (ZVS) condition, avoiding switching loss. In these embodiments, the switching cycle starts over with converter 100 in State 1, avoiding the State 0 condition.

In some embodiments of the method the switching time is extended. These embodiments can provide pulse width modulation (PWM), depending on the load requirement. In these embodiments $Q_r$ is turned on at some later time $t = t_7$. The delay time period $t_7 - t_6$ is sometimes referred to as a time slot $T_7 = t_7 - t_6$. At $t = t_7$ the voltage, $v_{Qr}(t)$ is essentially $V_{c1}$, a value greater than zero. Therefore, $Q_r$ will not be turned on with zero voltage condition at $t = t_7$. However, since the typical voltage level of $V_{c1}$ is very low compared to $V_{c2}$ and the current flowing into $Q_r$ starts from zero, the switching loss caused by voltage and current crossing is almost zero. In these embodiments the switching cycle starts over with converter 100 in State 0.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A converter circuit, comprising:
    an AC-to-DC converter, comprising a plurality of first power devices;
    a resonant DC link, comprising only one power transistor and a first and a second DC link line;
    a DC-to-AC converter, comprising a plurality of second power devices; and
    DC link lines, coupling the AC-to-DC converter, the resonant link, and the DC-to-AC converter, wherein
    a first terminal of the power transistor is connected to the first DC link lines and a second terminal of the power transistor is connected to the second DC link line; and
    the resonant DC link is operable to clamp an operating voltage of the converter;
    wherein the power transistor of the DC link comprises:
        an auxiliary power transistor selected from the group of MOS-FETs and npn bipolar transistors; and
        an auxiliary power diode, coupled across the auxiliary power transistor;

wherein the resonant DC link comprises:
a first capacitor, coupled in series with the power transistor;
a resonant capacitor, comprising parasitic capacitors of the power devices;
an inductance, coupled in parallel with the power transistor and the first capacitor, the inductance forming a resonant circuit with the resonant capacitor; and
a second capacitor, coupled in series with the resonant circuit.

2. The converter of claim 1, outputting an output voltage between the DC link lines, wherein the output voltage is essentially clamped to the sum of the voltage across the first capacitor and the voltage across the second capacitor.

* * * * *